US008989467B2

United States Patent
Hirota et al.

(10) Patent No.: US 8,989,467 B2
(45) Date of Patent: Mar. 24, 2015

(54) IMAGE PROCESSING APPARATUS, METHOD AND COMPUTER READABLE RECORDING MEDIUM FOR DETECTING ABNORMAL AREA BASED ON DIFFERENCE BETWEEN PIXEL VALUE AND REFERENCE SURFACE

(75) Inventors: Masashi Hirota, Hachioji (JP); Yamato Kanda, Hino (JP); Makoto Kitamura, Hachioji (JP); Takehiro Matsuda, Hachioji (JP); Takashi Kono, Tachikawa (JP)

(73) Assignee: Olympus Corporation, Tokyo (JP)

( * ) Notice: Subject to any disclaimer, the term of this patent is extended or adjusted under 35 U.S.C. 154(b) by 703 days.

(21) Appl. No.: 13/177,072

(22) Filed: Jul. 6, 2011

(65) Prior Publication Data
US 2012/0008839 A1 Jan. 12, 2012

(30) Foreign Application Priority Data

Jul. 7, 2010 (JP) .................................. 2010-155176

(51) Int. Cl.
G06K 9/00 (2006.01)
G06K 9/42 (2006.01)
G06T 7/00 (2006.01)

(52) U.S. Cl.
CPC ..... *G06T 7/0012* (2013.01); *G06T 2207/10024* (2013.01); *G06T 2207/10068* (2013.01); *G06T 2207/20036* (2013.01); *G06T 2207/20224* (2013.01); *G06T 2207/30028* (2013.01)
USPC .............................. 382/130; 382/128; 382/257

(58) Field of Classification Search
USPC ....................... 382/128, 130, 162, 260, 257
See application file for complete search history.

(56) References Cited

U.S. PATENT DOCUMENTS

| 5,859,698 | A * | 1/1999 | Chau et al. ................. 356/237.2 |
| 6,215,892 | B1 * | 4/2001 | Douglass et al. ............. 382/128 |
| 6,999,604 | B1 * | 2/2006 | Kim et al. ..................... 382/107 |
| 7,319,781 | B2 * | 1/2008 | Chen et al. .................... 382/128 |
| 2001/0052897 | A1 * | 12/2001 | Nakano et al. ................ 345/204 |
| 2002/0080998 | A1 * | 6/2002 | Matsukawa et al. .......... 382/103 |

(Continued)

FOREIGN PATENT DOCUMENTS

| JP | 2000-92319 A | 3/2000 |
| JP | 2002-94799 A | 3/2002 |

(Continued)

OTHER PUBLICATIONS

Chen et al. ("Recursive erosion, dilation, opening, and closing transforms," IEEE Transactions of Image Processing, 1995, pp. 335-345).*

(Continued)

*Primary Examiner* — Yubin Hung
(74) *Attorney, Agent, or Firm* — Scully, Scott, Murphy & Presser, P.C.

(57) ABSTRACT

An image processing apparatus includes a reference surface generating unit that generates a reference surface indicating a reference value of each of a plurality of color elements of pixels constituting an intraluminal image at a pixel position of the each color element by performing a morphology process using pixel values of the color elements; and an abnormal area detecting unit that detects an abnormal area from the intraluminal image based on a difference for each of the color elements between the pixel value of each pixel and the reference surface.

17 Claims, 14 Drawing Sheets

(56) References Cited

U.S. PATENT DOCUMENTS

| | | | |
|---|---|---|---|
| 2002/0177779 A1* | 11/2002 | Adler et al. | 600/476 |
| 2004/0027618 A1* | 2/2004 | Nakamura et al. | 358/3.26 |
| 2005/0080343 A1* | 4/2005 | Richards-Kortum et al. | 600/476 |
| 2005/0192476 A1* | 9/2005 | Homan et al. | 600/118 |
| 2006/0023966 A1* | 2/2006 | Vining | 382/260 |
| 2006/0064248 A1* | 3/2006 | Saidi et al. | 702/19 |
| 2006/0251322 A1* | 11/2006 | Palum et al. | 382/167 |
| 2006/0257031 A1* | 11/2006 | Abramoff et al. | 382/224 |
| 2007/0263920 A1* | 11/2007 | Fujii et al. | 382/141 |
| 2007/0292011 A1* | 12/2007 | Nishimura et al. | 382/128 |
| 2009/0034824 A1* | 2/2009 | Li et al. | 382/133 |
| 2009/0041322 A1* | 2/2009 | Wolf | 382/131 |
| 2009/0074268 A1* | 3/2009 | Tanaka et al. | 382/128 |
| 2009/0118614 A1* | 5/2009 | Sendai | 600/437 |
| 2009/0202124 A1 | 8/2009 | Matsuda | |
| 2010/0150413 A1* | 6/2010 | Futamura | 382/128 |
| 2010/0158330 A1* | 6/2010 | Guissin et al. | 382/128 |
| 2010/0239139 A1* | 9/2010 | Hunt et al. | 382/128 |
| 2011/0085717 A1* | 4/2011 | Matsuda | 382/128 |
| 2011/0125031 A1* | 5/2011 | Blit et al. | 600/476 |
| 2012/0039508 A1* | 2/2012 | Cao et al. | 382/103 |

FOREIGN PATENT DOCUMENTS

| | | |
|---|---|---|
| JP | 2004-61500 A | 2/2004 |
| JP | 2005-192880 | 7/2005 |
| JP | 2005-211439 A | 8/2005 |
| JP | 2007-304065 A | 11/2007 |
| JP | 2009-297450 A | 12/2009 |
| JP | 2010-279438 A | 12/2010 |
| WO | 2009/148092 A1 | 12/2009 |

OTHER PUBLICATIONS

Gonzalez et al. (Digital Image Proccessing, 1993, pp. 552-555).*

Jay, S.M., et al. "Dual delivery of VEGF and MCP-1 to support endothelial cell transplantation for therapeutic vascularization", Biomaterials 31 (2010), pp. 3054-3062.

Ricard, C., et al. "In vivo imaging of elastic fibers using sulforhodamine B", Journal of Biomedical Optics 12(6), pp. 1-8, (2007).

Sternberg, S.R., et al. "Biomedical Image Processing", Computer 16 (1), Jan. 1983, pp. 22-34.

Unknown Author, "What does the subtract background command do?", Subtract Background, pp. 1-2, downloaded Oct. 10, 2011 from http://imagejdocu.tudor.lu/.

European Search Report dated Oct. 19, 2011 from corresponding to European Application No. 11 00 5473.1.

Notice of Rejection dated May 20, 2014 from related Japanese Application No. 2010-155176, together with an English language translation.

* cited by examiner

IMAGE PROCESSING APPARATUS, METHOD AND COMPUTER READABLE RECORDING MEDIUM FOR DETECTING ABNORMAL AREA BASED ON DIFFERENCE BETWEEN PIXEL VALUE AND REFERENCE SURFACE

CROSS-REFERENCE TO RELATED APPLICATIONS

This application is based upon and claims the benefit of priority from Japanese Patent Application No. 2010-155176, filed on Jul. 7, 2010, the entire contents of which are incorporated herein by reference.

BACKGROUND OF THE INVENTION

1. Field of the Invention

The present invention relates to an image processing apparatus, a method of processing an image, and a computer-readable recording medium for detecting an abnormal area from an intraluminal image acquired by imaging the inside of a lumen.

2. Description of the Related Art

Conventionally, endoscopes are widely used as one type of medical observation device that is introduced inside a body of an examinee such as a patient so as to observe the inside of a lumen in the body. In addition, recently, an eating-type endoscope (capsule endoscope) is developed which has an imaging device and a communication device that transmits image data imaged by the imaging device outside the body in a wireless manner and the like within a capsule-type casing. Since observation and diagnosis using an image of the inside of the lumen (intraluminal image) that is imaged by such a medical observation device require an abundance of experience, a medical diagnosis supporting function that supports the diagnosis of a doctor is demanded. As one of image recognition technologies realizing such a function, there is suggested a technology for displaying an image to be focused for diagnosis by automatically detecting an abnormal area (lesion area) such as a bleeding site from the intraluminal image.

For example, in Japanese Laid-open Patent Publication No. 2005-192880, technology is disclosed in which clustering is performed by mapping pixel values of pixels positioned inside an image or an averaged pixel value into a feature space that is based on color information, and data of which a Euclid distance from the cluster of a normal mucous membrane area is a predetermined value or more is detected as an abnormal area.

SUMMARY OF THE INVENTION

An image processing apparatus according to an aspect of the present invention includes a reference surface generating unit that generates a reference surface indicating a reference value of each of a plurality of color elements of pixels constituting an intraluminal image at a pixel position of the each color element by performing a morphology process using pixel values of the color elements; and an abnormal area detecting unit that detects an abnormal area from the intraluminal image based on a difference for each of the color elements between the pixel value of each pixel and the reference surface.

A method of processing an image for detecting an abnormal area from an intraluminal image according to another aspect of the present invention includes generating a reference surface indicating a reference value of each of a plurality of color elements of pixels constituting an intraluminal image at a pixel position of the each color element by performing a morphology process using pixel values of the color elements; and detecting an abnormal area from the intraluminal image based on a difference for each of the color elements between of the pixel value of each pixel and the reference surface.

An image processing program for detecting an abnormal area from an intraluminal image according to the present invention causes a computer to perform generating a reference surface indicating a reference value of each of a plurality of color elements of pixels constituting an intraluminal image at a pixel position of the each color element by performing a morphology process using pixel values of the color elements; and detecting an abnormal area from the intraluminal image based on a difference for each of the color elements between of the pixel value of each pixel and the reference surface.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
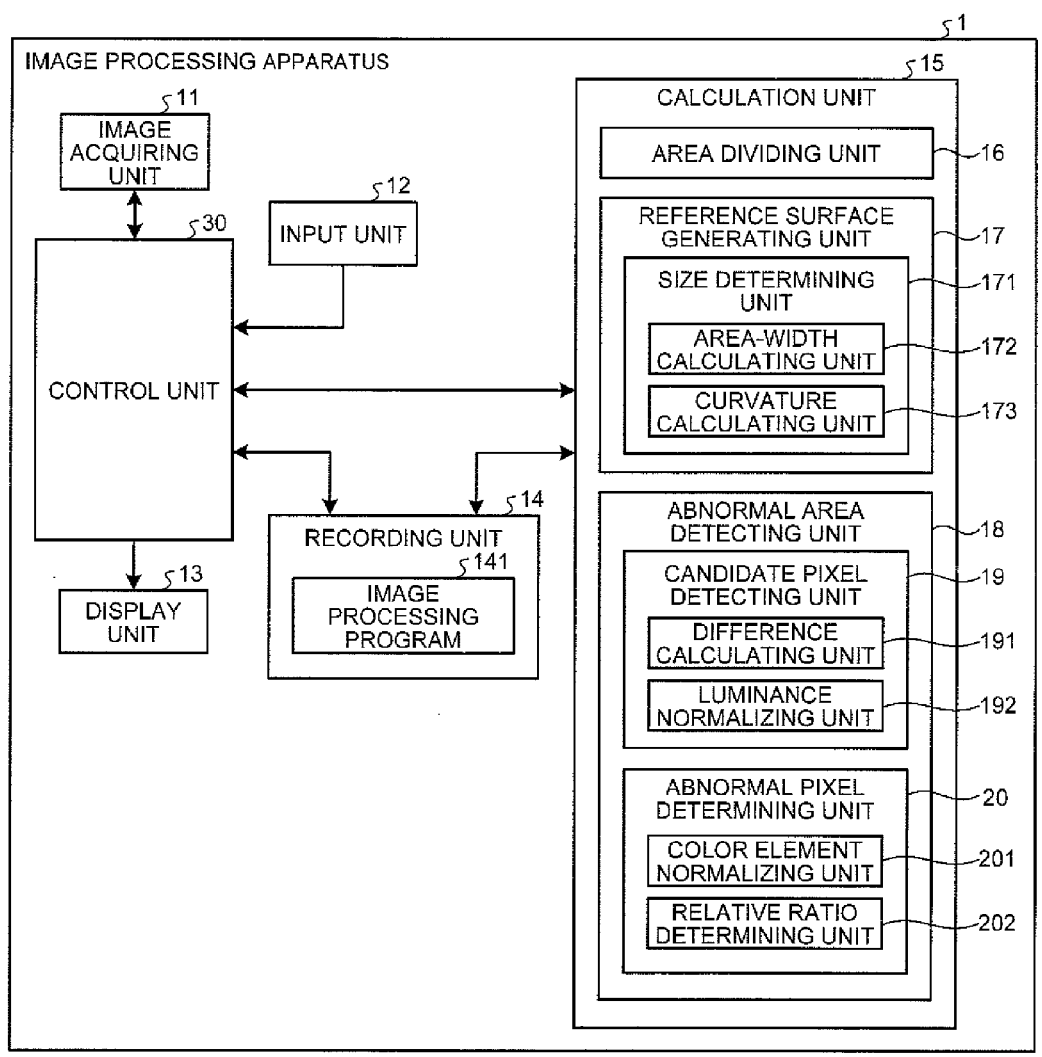
FIG. 1 is a block diagram illustrating the functional configuration of a first embodiment.

Hereinafter, preferred embodiments of the present invention will be described with reference to the accompanying drawings. However, the present invention is not limited thereto. Like reference numerals in the drawings denote like elements.

Here, an image processing apparatus according to an embodiment detects an abnormal area such as a bleeding site by processing an image (intraluminal image) that is acquired by imaging the inside of a lumen such as a gastrointestinal tract inside the body of an examinee by using a medical observation device, for example, an endoscope, a capsule endoscope, or the like. In addition, in this embodiment, the intraluminal image that is imaged by the medical observation device, for example, is a color image having pixel levels (pixel values) for the color components R (red), G (green), and B (blue) for each pixel. Hereinafter, in this embodiment, three values of R, G, and B values as the pixel values of each pixel are used as pixel values of a plurality of color elements.

First Embodiment

First, the configuration of an image processing apparatus according to a first embodiment will be described. FIG. 1 is a block diagram illustrating the functional configuration of an image processing apparatus 1 according to the first embodiment. The image processing apparatus 1 according to the first embodiment, as illustrated in FIG. 1, includes an image acquiring unit 11; an input unit 12; a display unit 13; a recording unit 14; a calculation unit 15; and a control unit 30 that controls the overall operation of the image processing apparatus 1.

The image acquiring unit 11 is used for acquiring image data of an intraluminal image that is imaged by a medical observation device, and the image data acquired by the image acquiring unit 11 is recorded in the recording unit 14, is processed by the calculation unit 15, and then, is displayed on the display unit 13 as is necessary. In a case where a portable recording medium is used for transmitting and receiving the image data to and from the medical observation device, for example, like a case where the medical observation device is a capsule endoscope or the like, the image acquiring unit 11 is configured by a reader device to which the recording medium is detachably attached and reads out the stored image data of the intraluminal image. Further, in a case where a server storing the image data of an intraluminal image that is imaged by the medical observation device is placed at an appropriate site and the image data is acquired from the server, the image acquiring unit 11 is configured by a communication device that is used for a connection to the server and the like. Then, the image processing apparatus 1 acquires the image data of the intraluminal image by performing data communication with the server through the image acquiring unit 11. In addition, alternatively, the image acquiring unit 11 may be configured by an interface device or the like that receives an image signal output from the medical observation device such as an endoscope through a cable.

The input unit 12 is realized, for example, by a keyboard, a mouse, a touch panel, or various switches and outputs an input signal to the control unit 30. The display unit 13 is realized by a display device such as an LCD or an EL display and displays various screens including the intraluminal image under the control of the control unit 30.

The recording unit 14 is realized by various IC memories such as a ROM configured by a rewritable flash memory or the like and a RAM, a hard disk that is built in or is connected through a data communication terminal, an information recording medium such as a CD-ROM, a reading device thereof, and the like. By operating the image processing apparatus 1, a program used for realizing various functions included in the image processing apparatus 1, data used during execution of the program, and the like are recorded therein. For example, image data of the intraluminal image that is acquired by the image acquiring unit 11 is recorded in the recording unit 14. In addition, an image processing program 141 that is used to detect an abnormal area from the intraluminal image by realizing the process according to the first embodiment is further recorded in the recording unit 14.

The calculation unit 15 is realized by hardware such as a CPU and performs various calculation processes for detecting an abnormal area by processing the intraluminal image. This calculation unit 15 includes an area dividing unit 16, a reference surface generating unit 17, and an abnormal area detecting unit 18.

The area dividing unit 16 divides the intraluminal image into a plurality of areas (hereinafter, each divided area is referred to as a "divided area") based on edge information.

The reference surface generating unit 17 generates a reference surface for each color element which represents a reference value of the color element at each pixel position located inside the divided area by performing a morphology process for each divided area using the pixel values of pixels positioned inside the divided area for each of the color elements of R, G, and B values. This reference surface generating unit 17 includes a size determining unit 171 that determines the size of a reference figure called a structure element that is used in a morphology process based on the size of the divided area and the pixel values of pixels positioned inside the divided area. This size determining unit 171 includes an area-width calculating unit 172 and a curvature calculating unit 173. The area-width calculating unit 172 calculates an area width in a direction perpendicular to the principal axis of the divided area. The curvature calculating unit 173 calculates the curvature of a profile in the direction perpendicular to the principal axis of the divided area.

The abnormal area detecting unit 18 detects an abnormal area for each divided area based on the pixel values of the color elements as the R, G, and B values of each pixel positioned inside the divided area and reference surfaces for each color element. This abnormal area detecting unit 18 includes a candidate pixel detecting unit 19 and an abnormal pixel determining unit 20. The candidate pixel detecting unit 19 is a functional unit that detects an abnormal candidate pixel, and includes a difference calculating unit 191 and a luminance normalizing unit 192. The difference calculating unit 191, for each color element, calculates a difference between a pixel value of the color element of each pixel positioned inside the divided area and the reference surface of the color element. The luminance normalizing unit 192 normalizes the difference for each color element that is calculated by the difference calculating unit 191 based on the luminance value of each pixel positioned inside the divided area. The abnormal pixel determining unit 20 is a functional unit that determines whether or not an abnormal candidate pixel is a pixel belonging to an abnormal area, and includes a color element normalizing unit 201 and a relative ratio determining unit 202. The color element normalizing unit 201 normalizes a difference for each color element that is calculated for an abnormal candidate pixel by the candidate pixel detecting unit 19 based on the magnitude relationship of R, G, and B values in the intraluminal image that is supposed in advance for the pixel values of each color element. The relative ratio determining unit 202 determines a relative ratio of the difference for each color element that is normalized by the color element normalizing unit 201.

The control unit 30 is realized by hardware such as a CPU. This control unit 30 controls the overall operation of the image processing apparatus 1 by transmitting instructions, data, or the like to each unit of the image processing apparatus 1 based on image data acquired by the image acquiring unit 11, an input signal input from the input unit 12, a program or data recorded in the recording unit 14, and the like.

Figure 2:
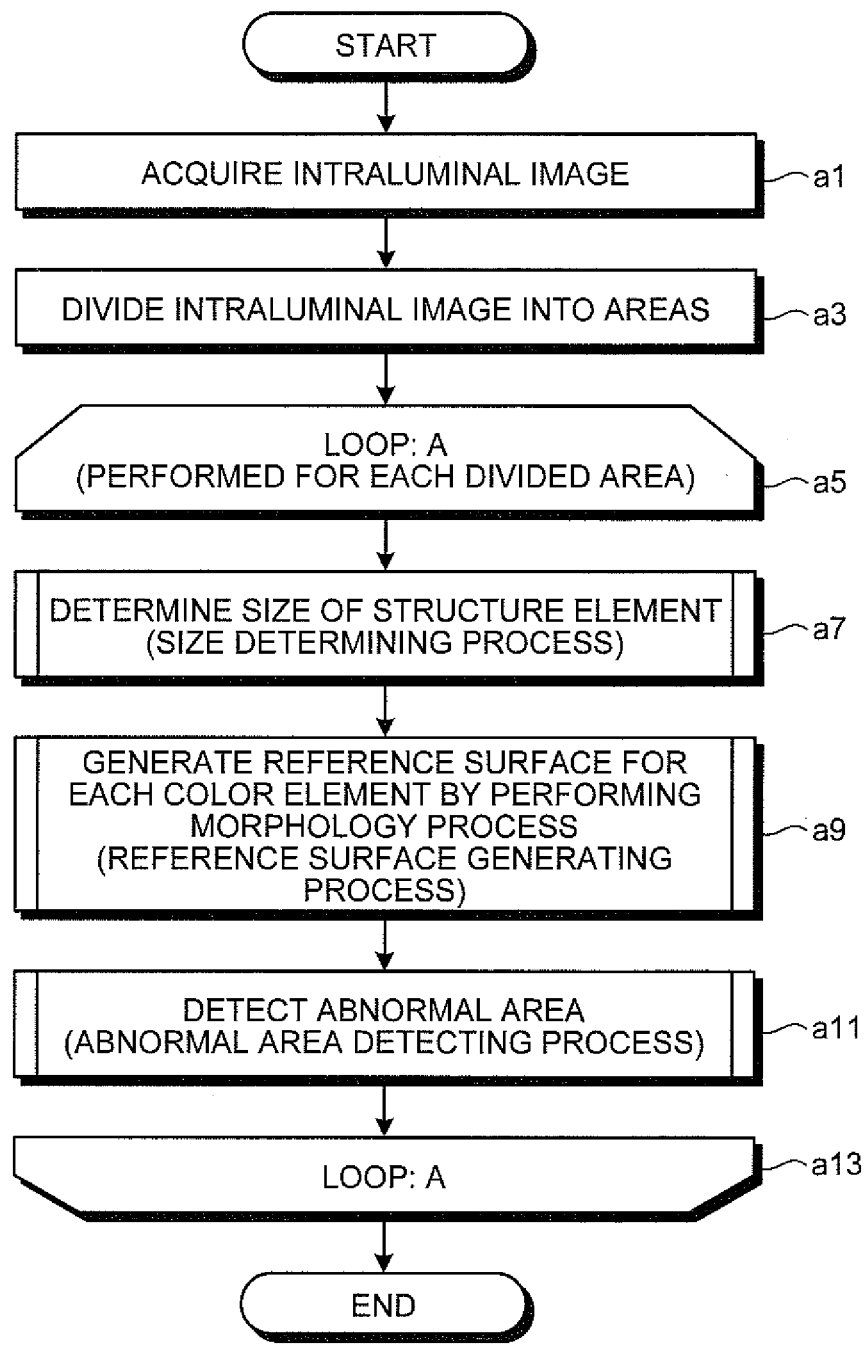
FIG. 2 is the entire flowchart illustrating the processing sequence performed by the image processing apparatus according to the first embodiment.

Next, the detailed processing sequence performed by the image processing apparatus 1 according to the first embodiment will be described. FIG. 2 is the entire flowchart illustrating the processing sequence performed by the image processing apparatus 1 according to the first embodiment. The process described here is realized by executing the image processing program 141 recorded in the recording unit 14 by using the calculation unit 15.

Figure 3:
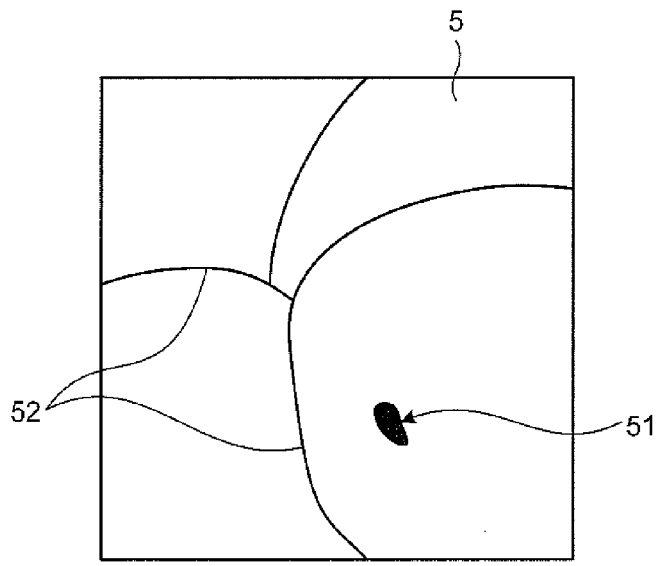
FIG. 3 is a schematic diagram illustrating an example of an intraluminal image.

As illustrated in FIG. 2, first, the calculation unit 15 acquires an intraluminal image as a processing target in Step a1. Through the process performed here, the calculation unit 15 reads out and acquires the intraluminal image as a processing target that is acquired by the image acquiring unit 11 and is recorded in the recording unit 14. FIG. 3 is a schematic diagram illustrating an example of the intraluminal image. As illustrated in FIG. 3, on the intraluminal image, basically, a mucous membrane 5 of the inner wall of a gastrointestinal tract is reflected, and an abnormal area 51 such as a bleeding site is reflected at times. In addition, on the intraluminal image, a groove that is generated due to a folding, an undulation of the mucous membrane 5, or the like, the contour of the mucous membrane 5, and the like appear as edges 52.

When the intraluminal image as a processing target is read, subsequently, as illustrated in FIG. 2, the area dividing unit 16 divides the area of the intraluminal image as a processing target in Step a3. At this time, the area dividing unit 16 divides the area based on the edge information so that an edge (for example, the edge 52 illustrated in FIG. 3) such as a boundary portion of the mucous membrane is not included in the inside thereof.

As the detailed processing sequence, for example, first, the edge strength of the intraluminal image as a processing target is calculated. The edge strength is calculated for each pixel by using a known edge extraction technique such as a first-order differential process using a Sobel filter or the like or a second-order differential process using Laplacian or the like. Here, hemoglobin that is a constituent element (a constituent element of blood) of an abnormal area such as a bleeding site reflected on the intraluminal image has a property of absorbing a large amount of light of a short-wavelength band. Since the hemoglobin has the property of absorbing light of a short-wavelength band, the luminance value of a G value or a B value, in which most of the wavelength component has a short wavelength band, decreases due to light absorption of the hemoglobin. On the other hand, since the R value, in which most of the wavelength component has a long wavelength band, is absorbed less and most of the light thereof is reflected, information on which the surface structure of a mucous membrane is reflected the most can be acquired from the R value. Thus, an R-value image acquired by setting the pixel value of each pixel to the R value thereof may be generated to calculate the edge strength of each pixel based on the R-value image.

Thereafter, the area of the intraluminal image is divided based on the edge strength of each pixel by using a known active contour method (reference: "Digital Image Processing", CG-ARTS Society, P196 to P200, *Area Dividing Process*). The active contour method is a method of extracting edges included in an image as a closed curve. In the active contour method, while the shape of an initial closed curve is changed, a closed curve is extracted in which an energy sum that is based on the continuity or the smoothness of the closed curve and the edge strength on the closed curve is the most stable. By using this active contour method, first, an initial closed area is set within the intraluminal image, and the contour thereof is used as the initial closed curve. Subsequently, by changing the shape of the initial closed area, a closed area that does not include an edge (a boundary portion of the mucous membrane) in the inside thereof is extracted, and the extracted closed area is set as a divided area. Thereafter, this process is repeated until the entire area of the intraluminal image belongs to any one of divided areas. As a result, the intraluminal image is divided into one or more divided areas that do not include any edge in the inside thereof.

When the area of the intraluminal image as a processing target is divided as above, subsequently, the process of a loop A is performed for each divided area (divisional area) in Steps a5 to a13. In this loop A, first, the size determining unit 171 of the reference surface generating unit 17 determines the size of the structure element used in the morphology process performed for the divided area as a processing target in the latter stage of Step a9 by performing the size determining process in Step a7.

Figure 4:
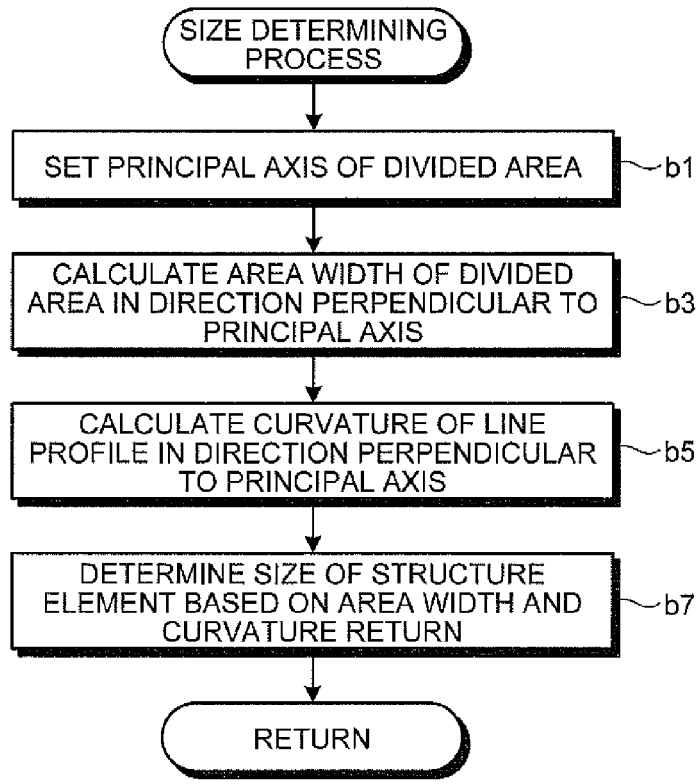
FIG. 4 is a flowchart illustrating the detailed processing sequence of a size determining process according to the first embodiment.
Figure 5:
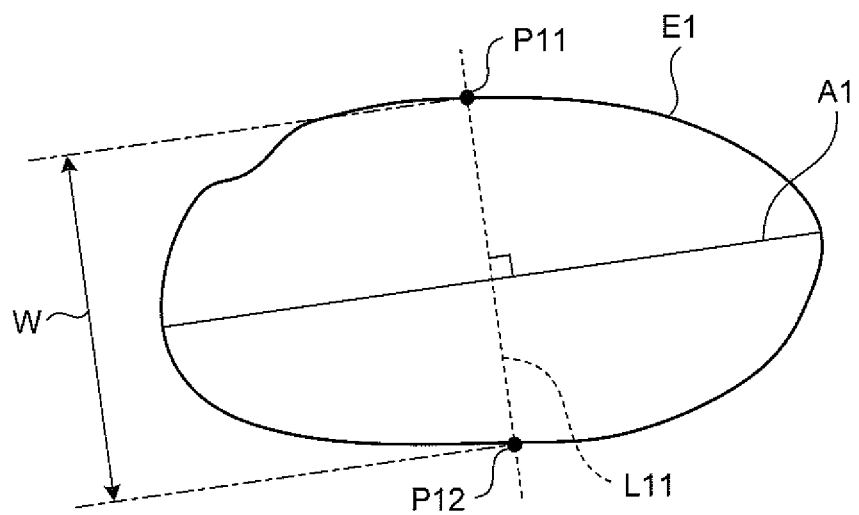
FIG. 5 is a diagram illustrating the principal axis and the area width of a divided area.

FIG. 4 is a flowchart illustrating the detailed processing sequence of the size determining process according to the first embodiment. In the size determining process of the first embodiment, as illustrated in FIG. 4, first, an area-width calculating unit 172 sets a principal axis (reference: "Digital Image Processing", CG-ARTS Society, P183, *Principal Axis*) of the divided area in Step b1. Subsequently, the area-width calculating unit 172 calculates an area width W in the direction perpendicular to the principal axis as a value that represents the size of the divided area in Step b3. FIG. 5 is a diagram illustrating an example of a divided area E1 and illustrates a principal axis A1 of the divided area E1 and the area width W that is calculated based on the principal axis A1. As illustrated in FIG. 5, the principal axis A1 of the divided area E1 is set in the long axis direction of the divided area E1. The area width W is calculated as the width of the divided area in the direction of a line L11 that passes through the center of the principal axis A1 and is perpendicular to the principal axis A1, that is, the length of a segment that joins intersections P11 and P12 of the line L11 and the contour of the divided area E1.

Figure 6:
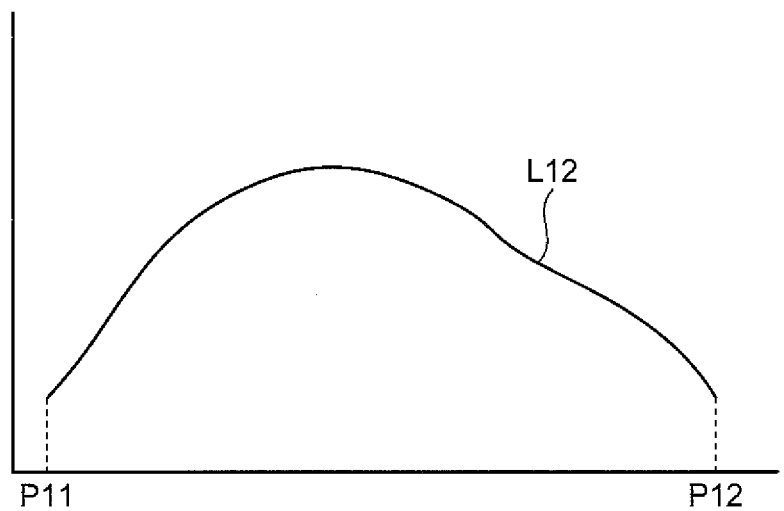
FIG. 6 is a diagram illustrating a line profile in the direction of a line perpendicular to the principal axis used for calculating the area width illustrated in FIG. 5.

Subsequently, the curvature calculating unit 173 calculates a curvature C of the line profile in the direction perpendicular to the principal axis used for calculating the area width W in Step b5. Here, the principle of calculating the curvature C of the line profile will be described. FIG. 6 is a diagram illustrating a line profile in the direction of the line L11 illustrated in FIG. 5 and illustrating a change curve L12 showing a change in the pixel value between the intersections P11 and P12 with the horizontal axis representing the pixel position on the line L11 illustrated in FIG. 5 and the vertical axis representing the pixel value of each corresponding pixel. In the first embodiment, the line profile represents a change in the pixel value of the pixels positioned inside a divided area that passes the center of the principal axis and is present in the direction perpendicular to the principal axis, that is, the pixels on a segment positioned inside the divided area of which the area width W is calculated. For example, the line profile represents the change curve L12 illustrated in FIG. 6, that is, the change in the pixel value of the pixels located on the line L11 between the intersections P11 and P12 illustrated in FIG. 5. In Step b5 illustrated in FIG. 4, the curvature of the curved shape represented by the change curve L12 is calculated as the curvature C.

Thereafter, the size determining unit 171 determines the size of the structure element by calculating a radius R of the structure element based on the area width W and the curvature C of the divided area, which are calculated in Steps b3 and b5, in Step b7. This process is performed, for example, by preparing a table in advance in which the radius R of the structure element is defined for each combination of the area width W and the curvature C and determining the radius R of the structure element according to the area width W and the curvature C calculated with reference to the table. The method of determining the radius R of the structure element is not limited thereto, and the radius R of the structure element may be determined based on the area width W and the curvature C of the divided area. For example, the radius R of the structure element may be determined by defining a relation equation used for determining the radius R of the structure element based on the area width W and the curvature C in advance and substituting the area width W and the curvature C, which have been calculated, in the relation equation. When the size (radius R) of the structure element is determined as above, the process is returned to Step a7 illustrated in FIG. 2 and then proceeds to Step a9.

Then, in Step a9, the reference surface generating unit 17 performs a reference surface generating process, thereby generating a reference surface for each color element by performing a known morphology process (reference: Obata Hidefumi, "Morphology", Corona Publishing Co., Ltd.) for a divided area as a processing target.

Figure 7:
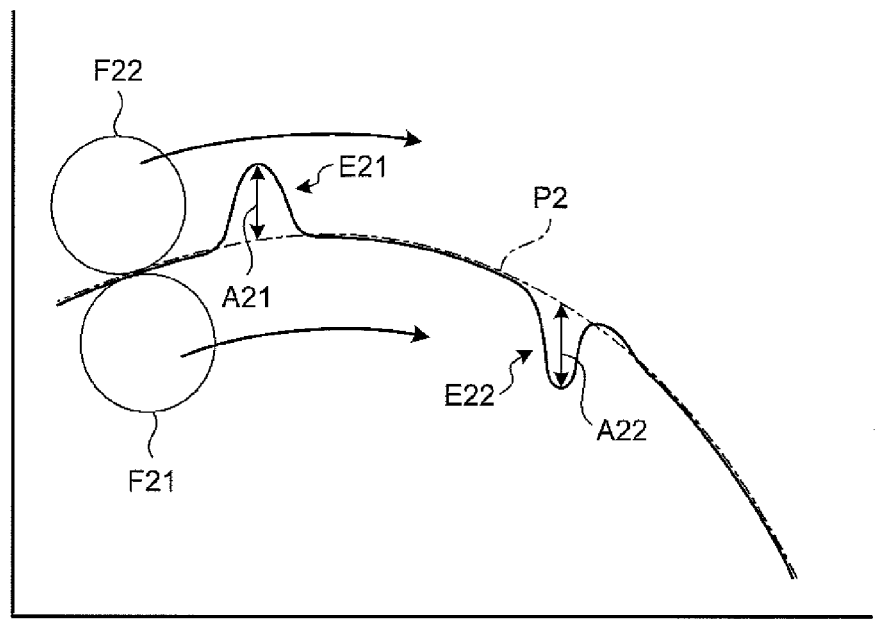
FIG. 7 is a diagram illustrating the principle of a reference surface generating process.

Here, the principle of the reference surface generating process will be described together with the principle of the morphology process. FIG. 7 is a diagram schematically illustrating a distribution of pixel values in which the pixel values of an intraluminal image are represented as elevation, and more particularly, a distribution of the pixel values on a cross-section of the intraluminal image in a predetermined direction is denoted by a solid line. In addition, in FIG. 7, a reference surface P2 that is generated as a result of the morphology process performed by using the pixel values having the distribution denoted by a solid line is denoted by a dashed dotted line.

As the morphology process, there are an opening process (hereinafter, referred to as a "morphology opening process") and a closing process (hereinafter, referred to as a "morphology closing process"). The morphology opening process is a process of acquiring the locus of a maximum value of the outer periphery of a structure element F21 illustrated in FIG. 7 when the structure element F21 is moved while being circumscribed about a target image from a side (lower side) of the target image on which the pixel value is relatively small in a three-dimensional space in which the pixel value is regarded as elevation. According to this morphology opening process, for example, a convex area such as a convex-shaped area (convex area) E21, which is illustrated in FIG. 7, locally having a value larger than that of the periphery thereof is smoothed. On the other hand, the morphology closing process is a process of acquiring the locus of a minimum value of the outer periphery of a structure element F22 when the structure element F22 is moved while being circumscribed about the target image from a side (upper side) on which the pixel value is relative large in a similar three-dimensional space. According to this morphology closing process, for example, a concave area such as a concave-shaped area (concave area) E22, which is illustrated in FIG. 7, locally having a value smaller than that of the periphery is smoothed. By performing the morphology opening process and the morphology closing process in a combinational manner for each color element, a reference surface P2 representing a reference value of the color element at each pixel position can be generated for each color element based on the pixel values of each color element of the periphery pixels.

Described in more detail, in the morphology opening process and the morphology closing process, there is used the structure element of the size determined for the divided area as a processing target by the size determining unit 171 through the size determining process illustrated in FIG. 4. In the morphology process, as illustrated in FIG. 7, the structure element is moved while being circumscribed about the target image from the side having a smaller pixel value or the side having a larger pixel value, whereby a concave area having a shape that is concave with respect to the periphery thereof and a convex area having a shape that is convex with respect to the periphery thereof are smoothed. Accordingly, in a case where the size of the structure element is small, a locus is acquired which intrudes into and passes through the inner side of the convex area E21 or the concave area E22 illustrated in FIG. 7, and thus a reference surface that intrudes into the convex area E21 or the concave area E22 is generated. On the other hand, in a case where the size of the structure element is large, for example, a situation may occur in which the entire change in the pixel value illustrated in FIG. 7 is smoothed as a convex area. According to the first embodiment, as described above, since the size of the structure element is determined based on the size of the divided area as a processing unit for the morphology process and the pixel values of pixels positioned inside the divided area (practically, the area width W and the curvature C of the divided area), the morphology process can be performed by using the structure element of an appropriate size that is neither too small nor too large, whereby a reference surface can be appropriately generated. In addition, according to the first embodiment, since the radius R is determined as the size of the structure element in Step b7 illustrated in FIG. 4 described above, for example, a circle of the determined radius R is used as the structure element in the morphology opening process and the morphology closing process. However, the shape of the structure element is not limited to a circular shape and may be another shape such as an oval shape.

Figure 8:
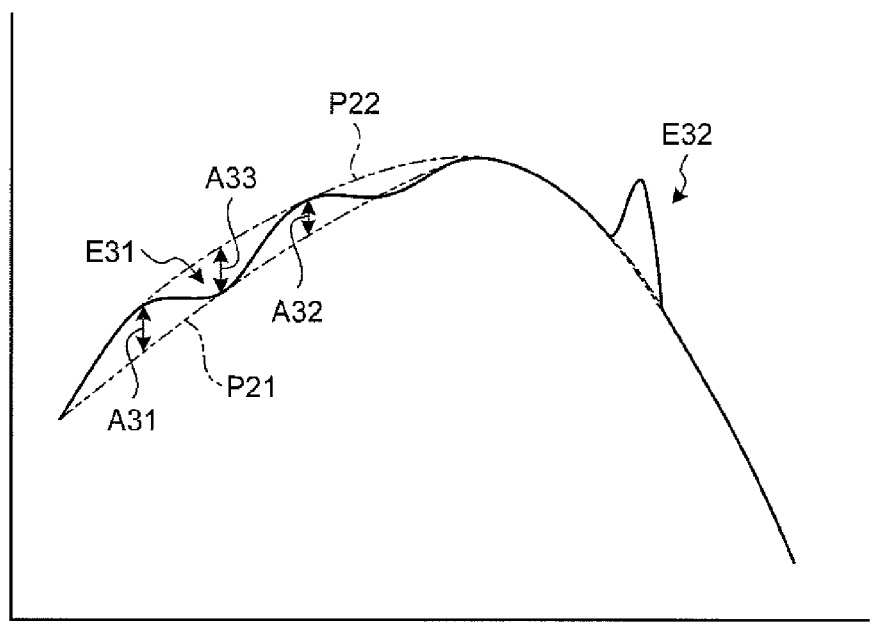
FIG. 8 is another diagram illustrating the principle of a reference surface generating process.

The three-dimensional shape of the mucous membrane face that is reflected on the intraluminal image is a convex shape as a whole. Accordingly, when the morphology opening process is performed first, in a case where a concave area due to a groove of the mucous membrane structure is present on a convex-shaped inclined face, there is a problem that the periphery thereof is smoothed as a convex area. FIG. 8 is a diagram illustrating a problem occurring in a case where the morphology opening process is performed first in the morphology process and schematically illustrates a distribution of pixel values of an intraluminal image similarly to FIG. 7. The distribution of pixel values, which is illustrated in FIG. 8, has a convex shape as a whole, and a concave area E31 due to a groove of the mucous membrane structure is present on an inclined face located on the observer's left side in FIG. 8 in the distribution. On the periphery of the concave area E31 that is present on the inclined face having a convex shape, the pixel values change in a convex shape.

At this time, when the morphology opening process is performed first, a convex-shaped portion located on the periphery of the concave area E31 is smoothed, and a reference surface P21 as denoted by a dashed-two dotted line in FIG. 8 may be generated. In the abnormal area detecting process performed in the latter stage, abnormal candidate pixels are detected by calculating a difference between the pixel value and the reference surface for each color element and performing threshold-value processing for an averaged difference value that is an average of the difference values for each color element. Accordingly, in a case where the reference surface P21 as described above is generated, a convex-shaped portion due to the differences denoted by arrows A31 and A32 in FIG. 8 may be detected as an abnormal candidate pixel. Thus, according to the first embodiment, the concave area E31 is smoothed by performing the morphology closing process first. Thereafter, by performing the morphology opening process for the result of the morphology closing process, the convex area E32 on the inclined face located on the right side is smoothed, and a reference surface P22 denoted by a dashed-dotted line in FIG. 8 is generated. Accordingly, a more appropriate reference surface can be generated.

Figure 9:
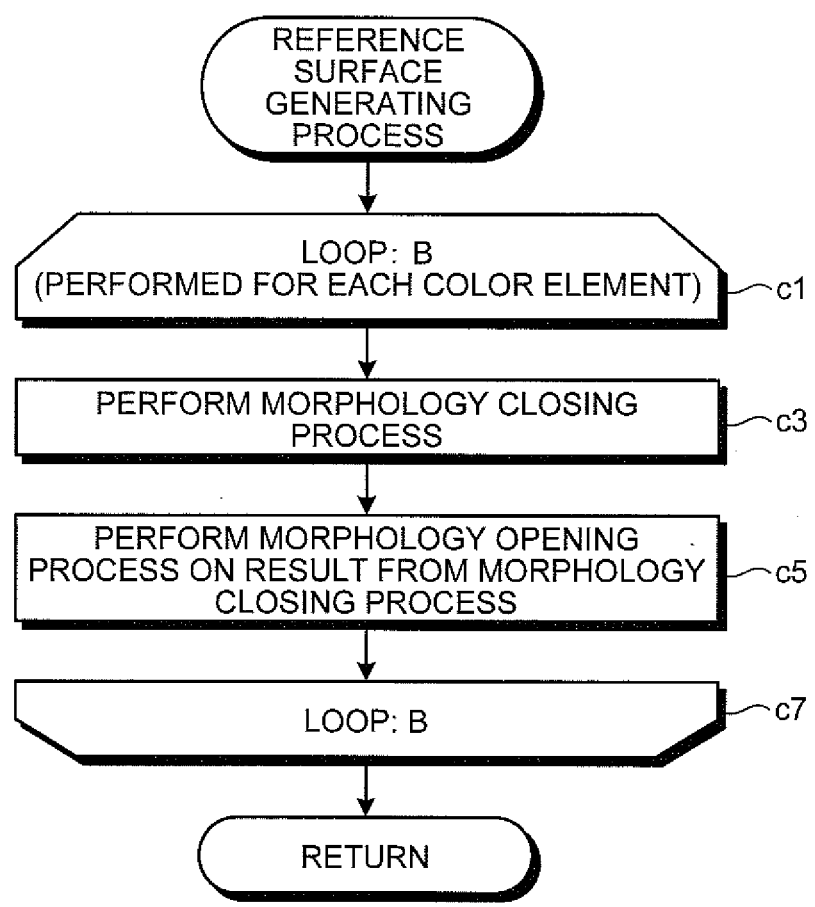
FIG. 9 is a flowchart illustrating the detailed processing sequence of the reference surface generating process.

In addition, practically, the reference surface generating process is performed for each divided area. Then, a reference surface is generated for each color element by performing a morphology process by using the pixel values of each pixel positioned inside the divided area for each color element of R, G, and B values. FIG. 9 is a flowchart illustrating the detailed processing sequence of the reference surface generating process.

As illustrated in FIG. 9, in the reference surface generating process, the process of loop B is performed for each color element in Steps c1 to c7. In other words, in loop B, first, the reference surface generating unit 17 performs a morphology closing process using the pixel values of a color element, which is a processing target, of the pixels positioned inside the divided area in Step c3. Subsequently, the reference surface generating unit 17 performs a morphology opening process for the result of the morphology closing process, which is acquired in Step c3, in Step c5.

Thereafter, the above-described process of loop B is performed for all the color elements, and when the process of loop B is completed, the process is returned to Step a9 illustrated in FIG. 2 and proceeds to Step a11.

Figure 10:
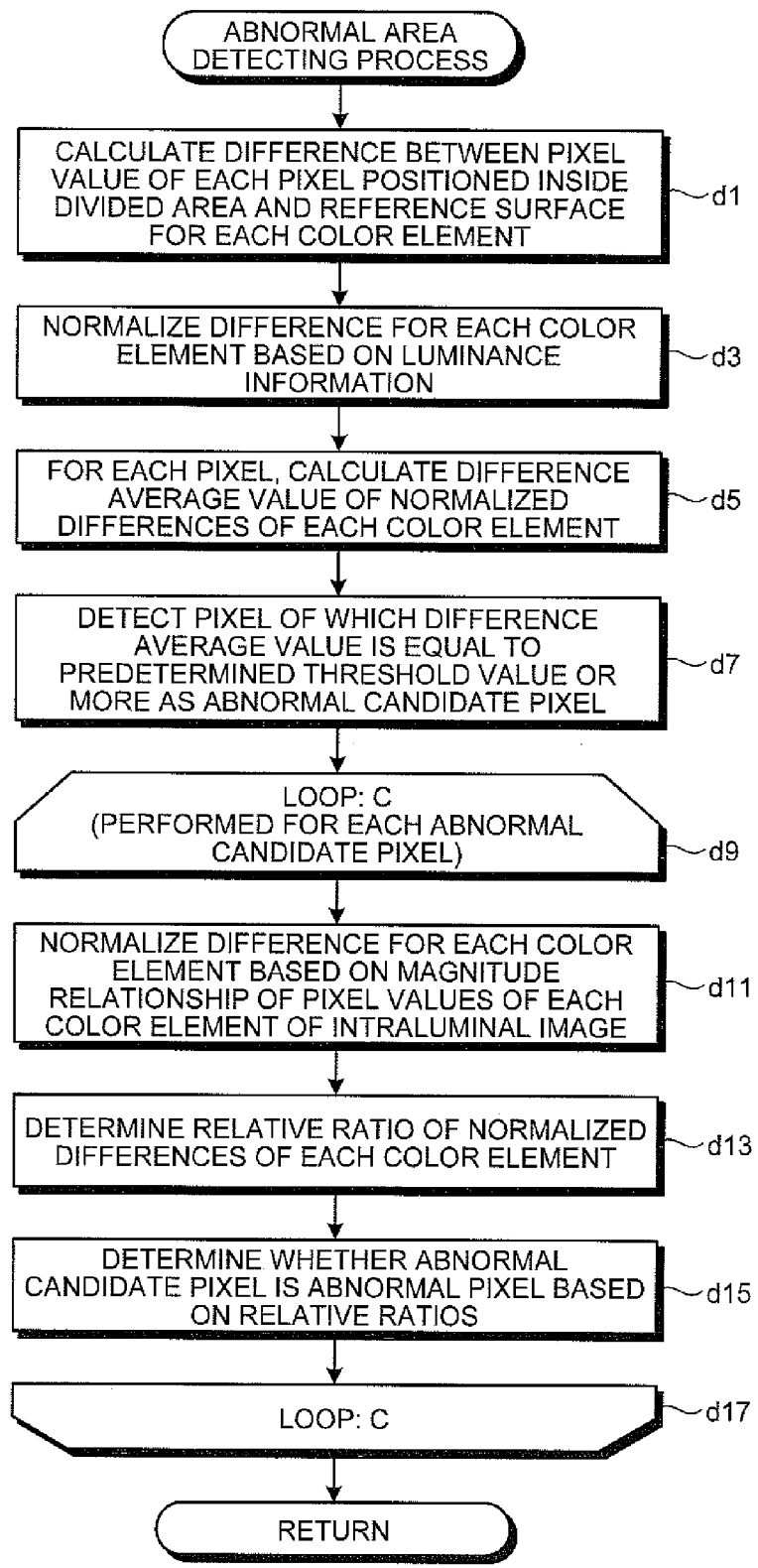
FIG. 10 is a flowchart illustrating the detailed processing sequence of an abnormal area detecting process.

In Step a11, the abnormal area detecting unit 18 detects an abnormal area from the inner side of the divided area as a processing target by performing the abnormal area detecting process. FIG. 10 is a flowchart illustrating the detailed processing sequence of the abnormal area detecting process. In this abnormal area detecting process, first, an abnormal candidate pixel is detected out of the pixels positioned inside the divided area as the processing target in Steps d1 to d7.

Described in more detail, as illustrated in FIG. 10, first, the difference calculating unit 191 calculates a difference between the pixel value of a corresponding color element of each pixel positioned inside the divided area and the reference surface of the corresponding color element for each color element in Step d1. Through this process, for example, differences A21 and A22 denoted by arrows in FIG. 7 are calculated.

Subsequently, the luminance normalizing unit 192 normalizes the difference for each color element of each pixel positioned inside the divided area based on luminance information of the intraluminal image as a processing target in Step d3. The difference for each color element that is calculated in Step d1 is larger as the pixel belongs to a brighter portion. In Step d7 of the latter stage, while an abnormal candidate pixel is detected by performing threshold value processing for a difference average value of the differences for each color element, the normalization of Step d3 is a process used for appropriately performing the above-described threshold value processing without being dependent on the magnitude of the value due to the brightness of the pixel. As the detailed processing sequence, for example, the luminance value I(x,y) of each pixel of the intraluminal image as a processing target is calculated in advance, and a maximum (maximum luminance value) I_max of the calculated luminance values I(x,y) of the pixels is acquired. Then, in Step d3, normalization is performed by using the calculated luminance value I(x,y) of each pixel and the maximum luminance value I_max as the luminance information. In other words, while the pixels positioned inside the divided are sequentially set as the processing pixel, first, a ratio I_max/I(x,y) acquired by dividing the maximum luminance value I_max by the luminance value I(x,y) of the processing target is calculated. Thereafter, by multiplying the difference for each color element of the processing pixel by the calculated ratio I_max/I(x,y), the difference for each color element of the processing target is normalized.

Thereafter, the candidate pixel detecting unit 19 acquires the difference average value of each pixel by calculating an average value of normalized differences for each color element for each pixel in Step d5. Then, the candidate pixel detecting unit 19 performs threshold value processing for the difference average value of each pixel positioned inside the divided area and detects a pixel of which the difference average value is a threshold value set in advance or more as an abnormal candidate pixel in Step d7. The threshold value used in this threshold value processing may be appropriately set. The threshold value may be a fixed value or, for example, may be set to be changed for each intraluminal image as a processing target. For example, the threshold value may be determined based on the magnitude of the average luminance of the intraluminal image as a processing target. Described in more detail, for example, a value acquired by multiplying the average luminance by an arbitrary coefficient may be calculated so as to be used as the threshold value.

In the abnormal candidate pixels detected as above, pixels other than abnormal pixels that actually constitute abnormal areas, for example, pixels detected due to non-uniformity of the image, the unevenness of an imaging target such as a mucous membrane are included. Thus, in the following Steps d9 to d17, an abnormal area is detected by determining whether or not the detected abnormal candidate pixels are abnormal pixels.

Described in more detail, the process of loop C is performed for each abnormal candidate pixel in Steps d9 to d17. In this loop C, first, the color element normalizing unit 201 normalizes each difference for each color element that is calculated for the abnormal candidate pixel as a processing target in Step d1 of the former stage based on the magnitude relationship that is supposed in advance for the pixel values of the color elements of the R, G, and B values of the intraluminal image in Step d11. In the intraluminal image, the pixel values of the color elements of the R, G, and B values have the relationship of "R value>G value>B value", and thus there is magnitude relationship that the G value or the B value is less than the R value. Accordingly, regarding the value of the difference that is calculated for each color element, the difference of the G value or the B value is less than the difference of the R value. In Step d13 of the latter stage, while it is determined whether or not the abnormal candidate pixel as a processing target is an abnormal pixel based on the relative ratios of the differences for the color elements, the normalization process of Step d11 is a process used for appropriately performing the above-described determination without being dependent on the magnitude relationship of the color elements. As a detailed processing sequence, for example, an average value Avg-R of the R values (R average value), an average value Avg_G of the G values (G average value), and an average value Avg_B of the B values (B average value) of the pixels positioned inside the divided area (a divided area to which the abnormal candidate pixel as a processing target belongs) as a processing target are calculated in advance. Then, in Step d11, the difference for each color element of the abnormal candidate pixel as a processing target is normalized by multiplying the difference of the G value of the abnormal candidate pixel as a processing target by Avg_R/Avg_G and multiplying the difference of the B value by Avg_R/Avg_B.

Here, the values used for the normalization process are not limited to the R average value Avg_R, the G average value Avg_G, and the B average value Avg_B. For example, the normalization process may be performed by multiplying the difference of the G value by R value/G value and multiplying the difference of the B value by R value/B value by using the R, G, and B values of the abnormal candidate pixel as a processing target.

Figure 11A:
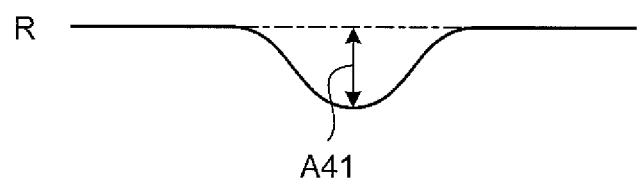
FIG. 11A is a diagram illustrating a distribution of R values of pixel values in a normal mucous membrane area.
Figure 11B:
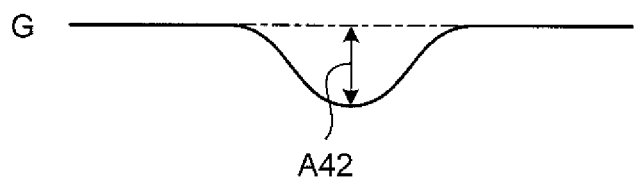
FIG. 11B is a diagram illustrating a distribution of G values of pixel values in a normal mucous membrane area.
Figure 11C:
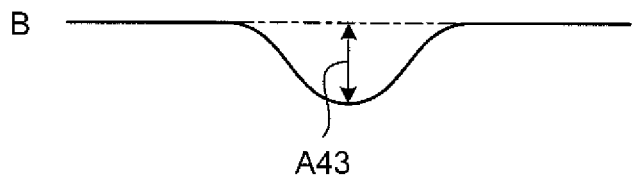
FIG. 11C is a diagram illustrating a distribution of B values of pixel values in a normal mucous membrane area.
Figure 12A:
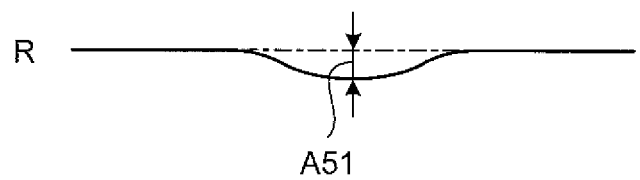
FIG. 12A is a diagram illustrating a distribution of R values of pixel values in an abnormal area.
Figure 12B:
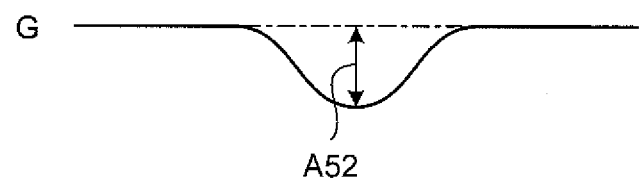
FIG. 12B is a diagram illustrating a distribution of G values of pixel values in an abnormal area.
Figure 12C:
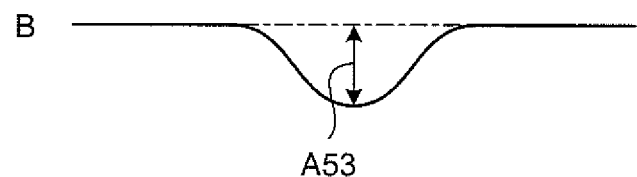
FIG. 12C is a diagram illustrating a distribution of B values of pixel values in an abnormal area.

Subsequently, the relative ratio determining unit 202 determines the relative ratios of the normalized differences of the abnormal candidate pixel as a processing target for the color elements in Step d13. Here, an abnormal area such as a bleeding site represents strong redness, and accordingly, the abnormal area is an area in which the ratio of pixel values of the color elements of the R, G, and B values is different from each other, differently from a normal mucous membrane area. Described in more detail, the ratio of the R value to the G value and the B value is different. FIGS. 11A to 11C are diagrams illustrating a distribution of pixel values in a mucous membrane area, on which a normal mucous membrane is reflected, having a depressed shape due to a mucous membrane structure. FIG. 11A represents the distribution of R values, FIG. 11B represents the distribution of the G values, and FIG. 11C represents the distribution of B values. In each diagram, the reference surface of the corresponding color element is denoted by a dashed-dotted line. FIGS. 12A to 12C are diagrams illustrating the distribution of pixel values near an abnormal area. FIG. 12A represents the distribution of R values, FIG. 12B represents the distribution of G values, and FIG. 12C illustrates the distribution of B values. In each diagram, the reference surface of a corresponding color element is denoted by a dashed-dotted line.

As illustrated in FIGS. 11A, 11B, and 11C, in a place at which the mucous membrane is depressed due to the mucous membrane structure, the pixel values of the color elements of R, G, and B values change so as to draw change curves having almost similar shapes, and the relative ratios of the pixel values of the color elements at each pixel are about the same. In other words, a difference A41 of the R value with respect to the reference surface of the R value, a difference A42 of the G values with respect to the reference surface of the G value, and the difference A43 of the B values with respect to the reference surface of the B value, denoted by arrows in FIGS. 11A, 11B, and 11C, are values of a same level. Particularly, according to the first embodiment, in the reference surface generating process of the former stage illustrated in FIG. 9, the morphology closing process is performed first, and the morphology opening process is performed for the result of the morphology closing process. Accordingly, a pixel positioned in the concave area E31 due to the groove of the mucous membrane structure illustrated in FIG. 8 may be detected as an abnormal candidate pixel due to a difference denoted by the arrow A33.

In addition, as illustrated in FIGS. 12A, 12B, and 12C, in an abnormal area in which redness is strong, the relative ratios of pixel values of the color elements of the R, G, and B values are different from each other. To be more specific, while the G value and the B values change almost the same, the change in the R value is different from the change in the G value or the B value. In other words, there is a difference among the difference A51 in the R value with respect to the reference surface of R values, the difference A52 in the G value with respect to the reference surface of the G value, and the difference A53 in the B value with respect to the reference surface of the B value, denoted by arrows in FIGS. 12A, 12B, and 12C.

In Step d13 illustrated in FIG. 10, the relative ratio of the difference for each color element is determined. Then, in the following Step d15, the abnormal pixel determining unit 20 determines whether or not the abnormal candidate pixel as a processing target is an abnormal pixel based on the relative ratios determined by the relative ratio determining unit 202. To be more specific, in a case where the difference in the G value and the difference in the B value are greater than the difference in the R value, the abnormal candidate pixel as a processing target is determined as an abnormal pixel.

Thereafter, when the above-described process of loop C is performed for all the abnormal candidate pixels, and the process of loop C is completed, the process is returned to Step a11 illustrated in FIG. 2. Then, when the above-described process of loop A is performed for all the divided areas, and the process of loop A is completed, this process ends.

As described above, according to the first embodiment, by performing the morphology process using pixel values of the color element, which is a processing target, of pixels positioned inside a divided area for each divided area acquired by dividing the area of the intraluminal image, the reference surface for each color element is generated. Accordingly, based on the pixel values of each color element at periphery pixels, the reference surface that represents a reference value of the color element at each pixel position can be generated for each color element. In addition, according to the first embodiment, by detecting abnormal candidate pixels based on a difference between the pixel value of each pixel positioned inside the divided area and the reference surface for each color element and determining whether or not an abnormal candidate pixel is an abnormal pixel based on the relative ratio of the difference for each color element of the abnormal candidate pixel, an abnormal area is detected. Described in more detail, an abnormal candidate pixel having different differences for each color element, for example, an abnormal candidate pixel having the difference in the G value and the difference in the B value to be greater than the difference in the R value is determined as an abnormal pixel based on the relative ratios of the differences for each color element, thereby detecting an abnormal area. Accordingly, a pixel in which the differences for each color element are approximately at the same level such as a pixel of which the pixel value changes with respect to the periphery thereof due to the structure of the mucous membrane can be prevented from being determined as an abnormal pixel. Therefore, an abnormal area can be detected from the intraluminal image with high accuracy.

Second Embodiment

Figure 13:
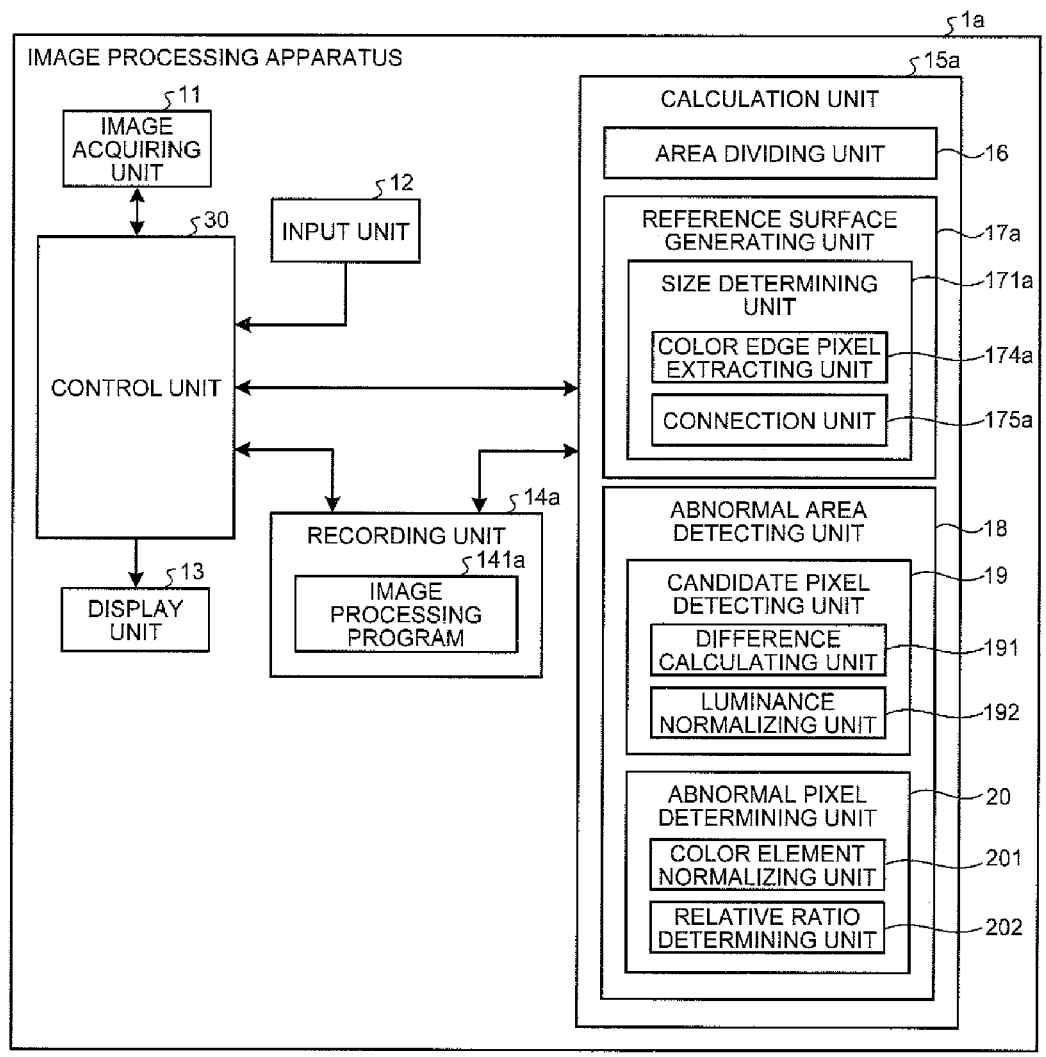
FIG. 13 is a block diagram illustrating the functional configuration of an image processing apparatus according to a second embodiment.

First, the configuration of an image processing apparatus according to a second embodiment will be described. FIG. 13 is a block diagram illustrating the functional configuration of an image processing apparatus 1a according to the second embodiment. The same reference numeral is assigned to the same configuration as that described in the first embodiment. The image processing apparatus 1a according to the second embodiment, as illustrated in FIG. 13, includes an image acquiring unit 11, an input unit 12, a display unit 13, a recording unit 14a, a calculation unit 15a, and a control unit 30 that controls the overall operation of the image processing apparatus 1a.

In the recording unit 14a, an image processing program 141a that is used for detecting an abnormal area from an intraluminal image by realizing the process of the second embodiment is recorded.

In addition, the calculation unit 15a includes an area dividing unit 16, a reference surface generating unit 17a, and an abnormal area detecting unit 18. In the second embodiment, the configuration of the reference surface generating unit 17a is different from that of the first embodiment. The reference surface generating unit 17a of the second embodiment includes a size determining unit 171a that determines the size of a structure element used in the morphology process based on pixel values of the pixels positioned inside the divided area. This size determining unit 171a includes a color edge pixel extracting unit 174a and a connection unit 175a. The color edge pixel extracting unit 174a calculates the color edge strength of each pixel positioned inside the divided area and extracts color edge pixels based on the calculated color edge strength. The connection unit 175a connects the color edge pixels linked to each other as one color edge pixel group.

Figure 14:
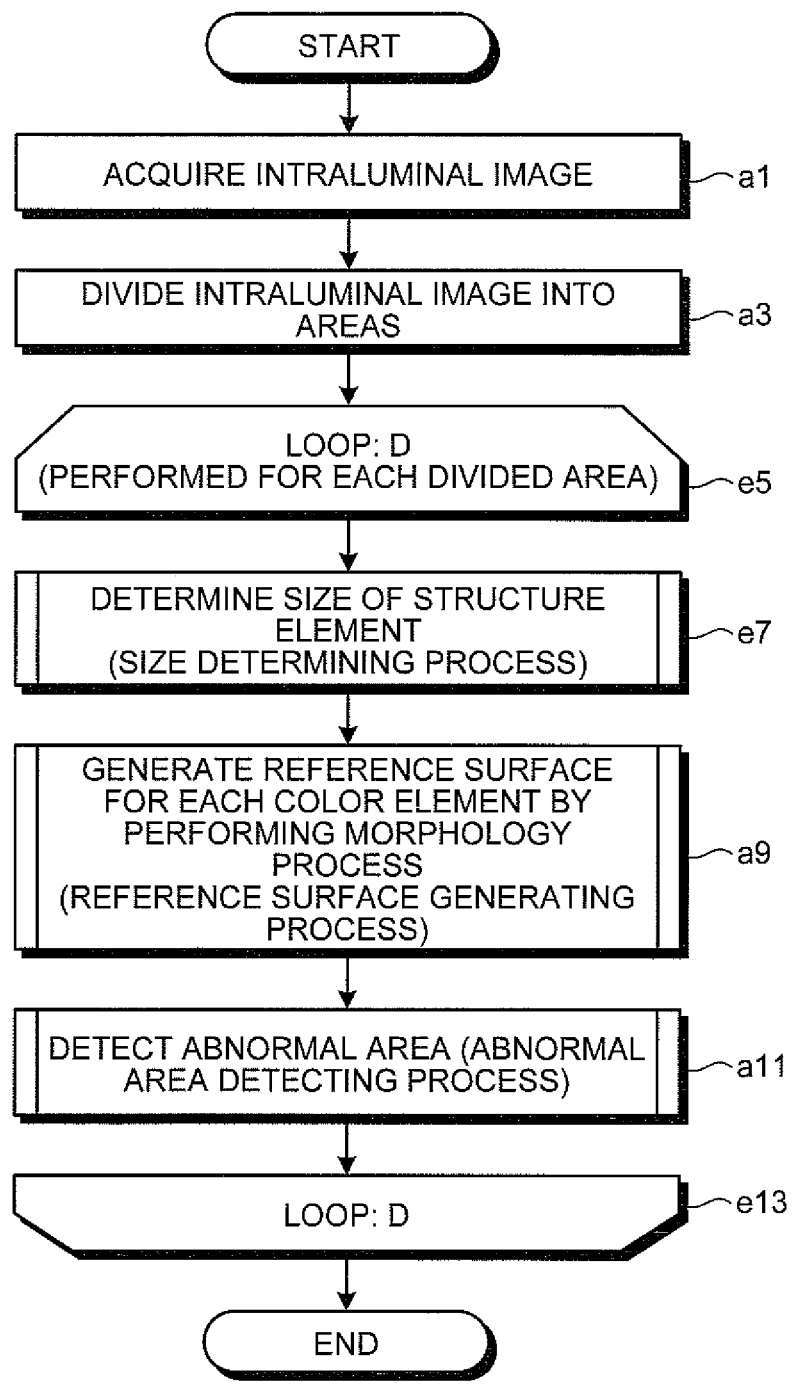
FIG. 14 is the entire flowchart illustrating the processing sequence performed by the image processing apparatus according to the second embodiment.

Next, the processing sequence performed by the image processing apparatus 1a according to the second embodiment will be described. FIG. 14 is the entire flowchart illustrating the processing sequence performed by the image processing apparatus 1a according to the second embodiment. The process described here is realized by executing the image processing program 141a recorded in the recording unit 14a by using the calculation unit 15a. The same reference numeral is assigned to the same process as that of the first embodiment in FIG. 14.

As illustrated in FIG. 14, according to the second embodiment, after the area dividing unit 16 divides the area of the intraluminal image in Step a3, the process of loop D is performed for each divided area in Steps e5 to e13. In this loop D, first, the size determining unit 171a determines the size of the structure element used in the morphology process performed for a divided area as a processing target in the latter stage of Step a9 by performing the size determining process in Step e7. Then, after this size determining process is performed, the process proceeds to the reference surface generating process of Step a9 described in the first embodiment.

Figure 15:
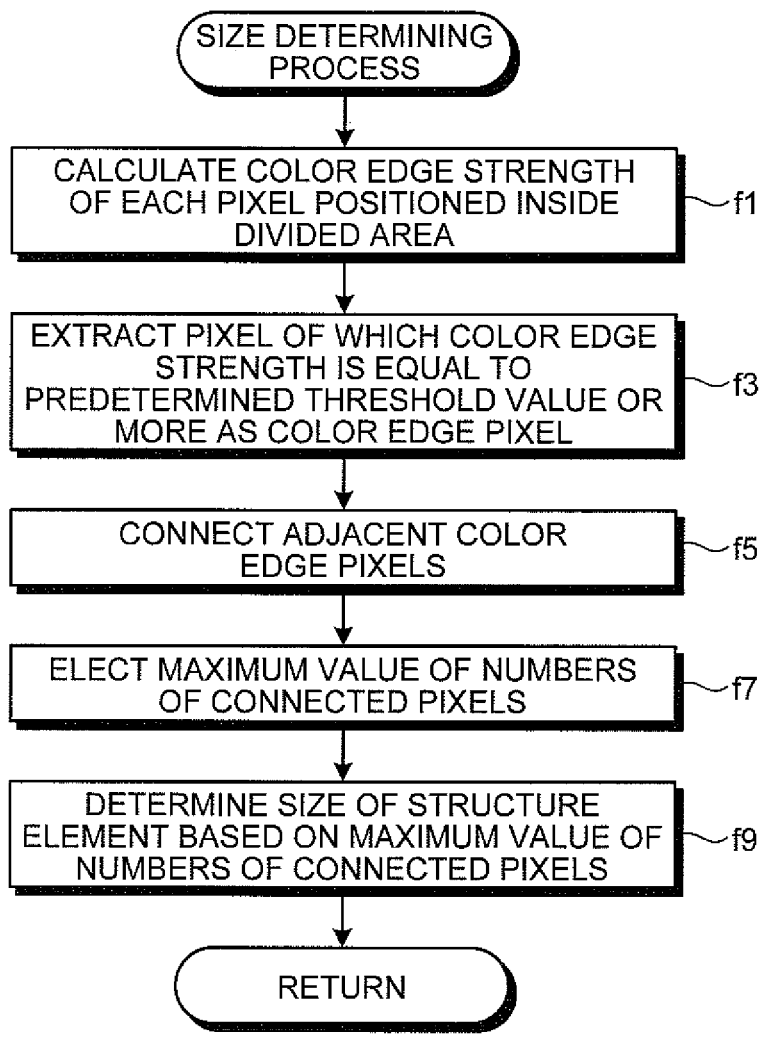
FIG. 15 is a flowchart illustrating the detailed processing sequence of a size determining process according to the second embodiment.

FIG. 15 is a flowchart illustrating the detailed processing sequence of the size determining process according to the second embodiment. In the size determining process of the second embodiment, as illustrated in FIG. 15, first, the color edge pixel extracting unit 174a calculates the color edge strength of each pixel positioned inside the divided area in Step f1. As the detailed processing sequence, first, the R, G, and B values of each pixel positioned inside the divided area are converted into an L*a*b* value (reference: "Digital Image Processing", CG-ARTS Society, P62). Thereafter, a filtering process is performed in which a horizontal Sobel filter is applied to each element (L*, a*, b*) of the calculated L*a*b value of each pixel positioned inside the divided area. Then, the horizontal color edge strength ΔErow is calculated by using the following Equation (1) based on the result of the process. In the following Equation (1), Sobel_L* represents a result of the applying of the Sobel filter to L*, Sobel_a represents a result of the applying of the Sobel filter to a*, and Sobel_b* represents a result of the applying of the Sobel filter to b*.

$$\Delta E_{row} = \sqrt{Sobel\_L^{*2} + Sobel\_a^{*2} + Sobel\_b^{*2}} \quad (1)$$

Subsequently, in the similar sequence, a filtering process is performed in which a vertical Sobel filter is applied to each element of the L*a*b*, thereby calculating the vertical color edge strength $\Delta E_{col}$. Then, the color edge strength ΔE of each pixel positioned inside the divided area is calculated by using the following Equation (2) based on the horizontal color edge strength $\Delta E_{row}$ and the vertical color edge strength $\Delta E_{col}$ that have been acquired.

$$\Delta E = \sqrt{\Delta E_{row}^2 + \Delta E_{col}^2} \quad (2)$$

Subsequently, the color edge pixel extracting unit 174a extracts pixels of which the color edge strength is a predetermined threshold value or more as color edge pixels by performing threshold value processing for the color edge strength of each pixel positioned inside the divided area in Step f3. At this time, a provisional pixel value "1" is assigned to the color edge pixels, and a provisional pixel value "0" is assigned to pixels other than the color edge pixels.

Subsequently, the connection unit 175a connects the linked color edge pixels out of the color edge pixels extracted in Step f3 as one color edge pixel group in Step f5. Described in more detail, by connecting the color edge pixels adjacent to each other, the color edge pixels are delimited for each connection component. Thereafter, the delimited pixel groups are respectively set as the color edge pixel groups, and a unique label used for identifying each color edge pixel group is added by performing a labeling process. In a case where an abnormal area is present inside the divided area, the contour pixels are extracted as the color edge pixels. Accordingly, the size of the abnormal area that is present inside the divided area can be estimated based on the connected component of the color edge pixels (the linked color edge pixel group).

Thereafter, the size determining unit 171a counts the number of pixels (the number of connected pixels) of each color edge pixel group and elects a maximum value Num thereof in Step f7. Then, the size determining unit 171a determines the size of the structure element by calculating the radius R of the structure element by using the following Equation (3) based on the maximum value Num of the numbers of connected pixels in Step f9. In Equation (3), k denotes an arbitrary constant number.

$$R = k \frac{Num}{2\pi} \quad (3)$$

The method of determining the radius R of the structure element is not limited thereto, and the radius R of the structure element may be determined based on the maximum value Num of the numbers of connected pixels. Accordingly, for example, a table defining the correspondence relationship between the maximum value Num of the numbers of connected pixels and the radius R of the structure element may be prepared in advance, and the radius R of the structure element corresponding to the maximum value Num of the numbers of connected pixels that has been elected by referring to the table may be determined. When the size (the radius R) of the structure element is determined as above, the process is returned to Step e7 illustrated in FIG. 14 and then proceeds to Step a9.

As described above, according to the second embodiment, the same advantages as those of the first embodiment can be acquired. In the second embodiment, the color edge pixels are extracted based on the color edge strength of each pixel positioned inside the divided area. Then, the size of the structure element used in the morphology process is determined based on the size of the abnormal area present inside the divided area that is estimated based on the number of connected pixels of the connection component of the color edge pixels (the number of pixels of the linked color edge pixel group). Therefore, a more appropriate reference surface can be generated.

In addition, in the above-described first and second embodiments, the intraluminal image is divided into a plurality of areas. Then, the reference surface is generated for each divided area that has been divided, and an abnormal area is detected for each divided area. However, the process of dividing the intraluminal image into a plurality of areas is not essential. Thus, a reference surface may be generated for the entire area of the intraluminal image as one area to detect an abnormal area from the intraluminal image based on a difference for each color element between the pixel value of each pixel and the reference surface.

Furthermore, the image processing apparatus 1 according to the first embodiment and the image processing apparatus 1a according to the second embodiment described above can be realized by executing a program prepared in advance by using a computer system such as a personal computer or a workstation. Hereinafter, a computer system that has the same functions as those of the image processing apparatuses 1 and 1a described in the first and second embodiments and executes the image processing program 141 or 141a will be described.

Figure 16:
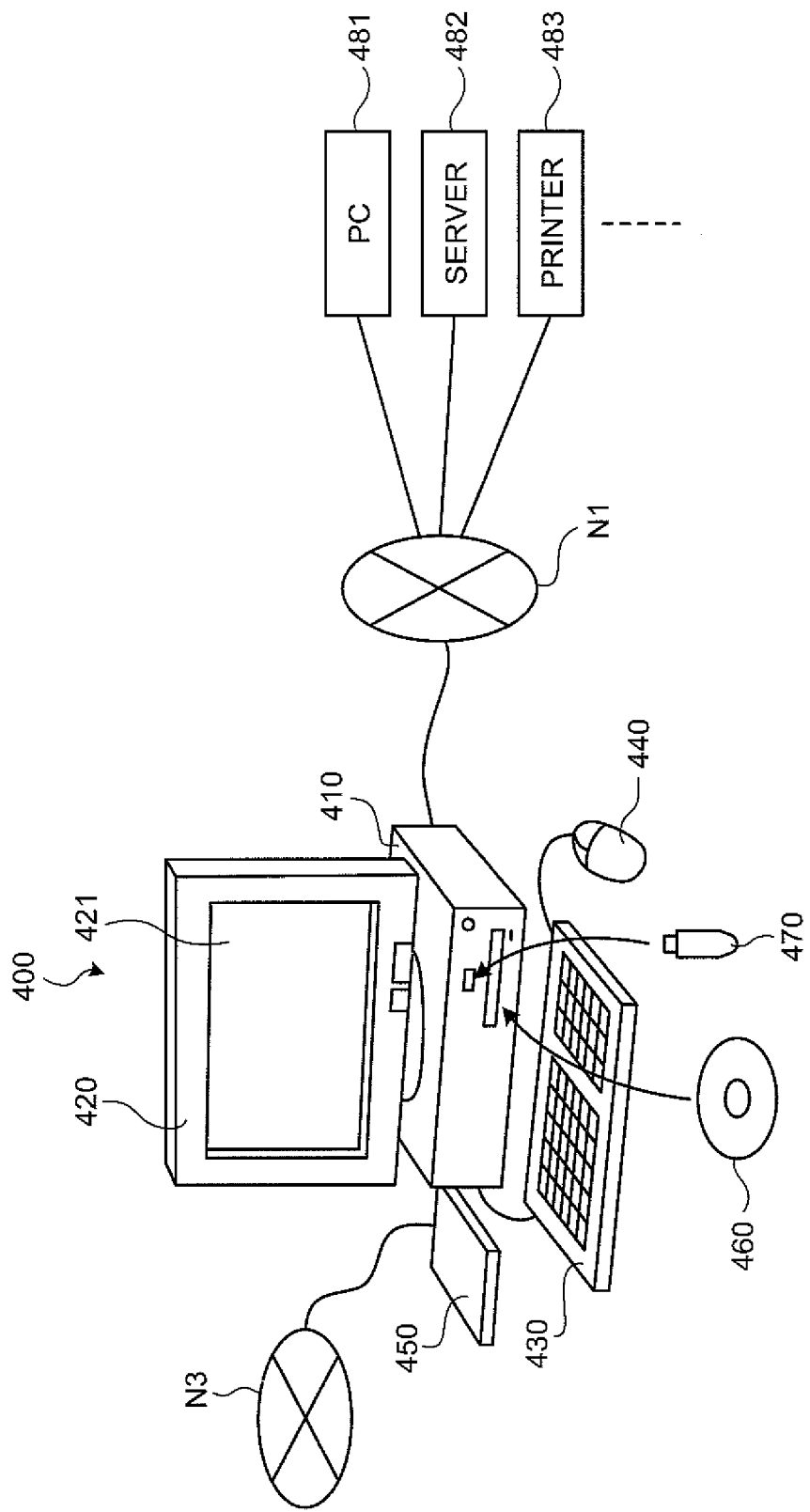
FIG. 16 is a system configuration diagram illustrating the configuration of a computer system to which the present invention is applied.
Figure 17:
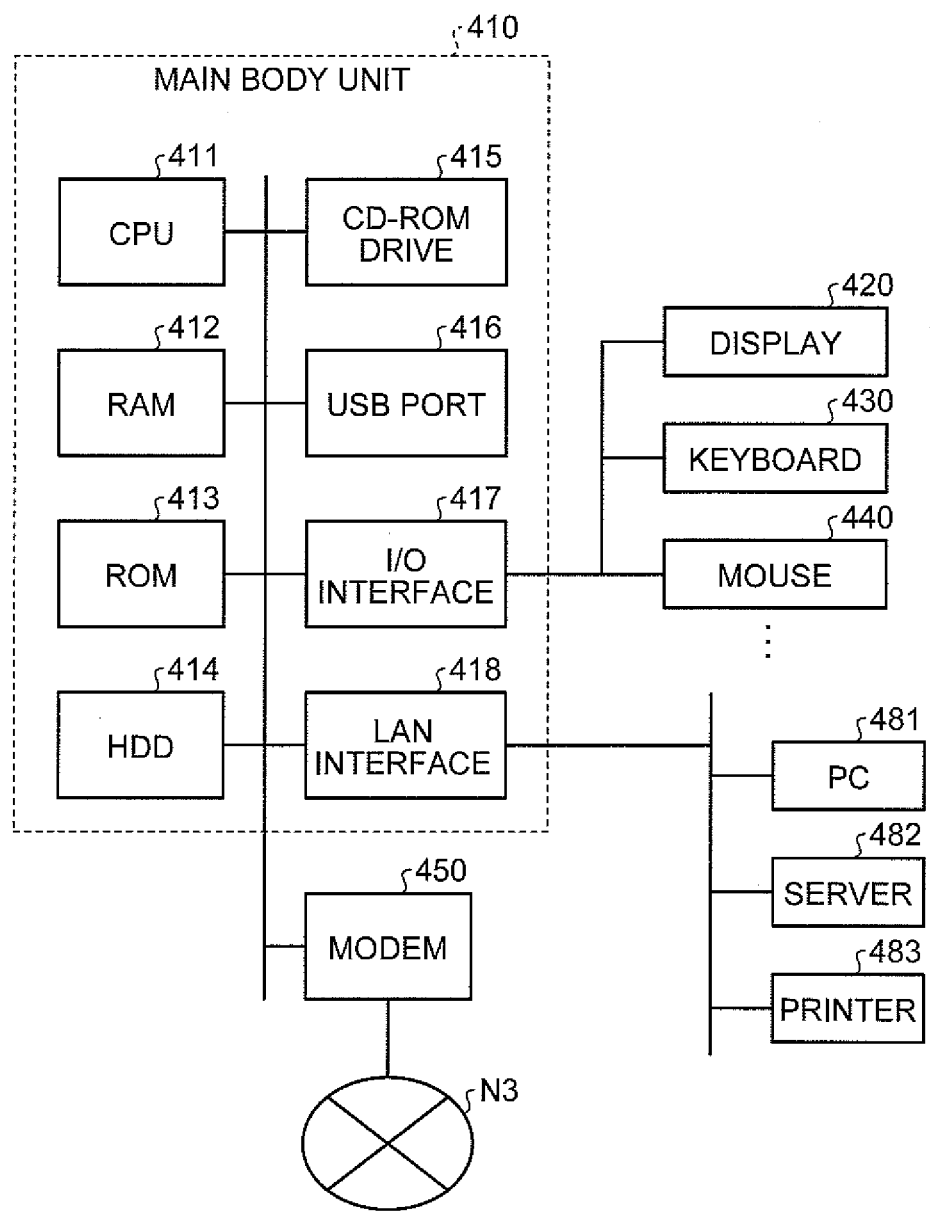
FIG. 17 is a block diagram illustrating the configuration of a main body unit that configures the computer system illustrated in FIG. 16.

FIG. 16 is a system configuration diagram illustrating the configuration of a computer system 400 according to this modified example, and FIG. 17 is a block diagram illustrating the configuration of a main body unit 410 of the computer system 400. As illustrated in FIG. 16, the computer system 400 includes a main body unit 410, a display 420 that is used for displaying information such as an image on a display screen 421 in accordance with an instruction transmitted from the main body unit 410, a keyboard 430 that is used for inputting various types of information to the computer system 400, and a mouse 440 that is used for designating an arbitrary position on the display screen 421 of the display 420.

In addition, the main body unit 410 of this computer system 400, as illustrated in FIGS. 16 and 17, includes a CPU 411, a RAM 412, a ROM 413, a hard disk drive (HDD) 414, a CD-ROM drive 415 that accepts a CD-ROM 460, a USB port 416 to which a USB memory 470 can be detachably connected, an I/O interface 417 that connects the display 420, the keyboard 430, and the mouse 440 together, and a LAN interface 418 that is used for being connected to a local area network or a wide area network (LAN/WAN) N1.

Furthermore, to this computer system 400, a modem 450 that is used for being connected to a public circuit N3 such as the Internet is connected, and a personal computer (PC) 481 as another computer system, a server 482, a printer 483, and the like are connected through the LAN interface 418 and the local area network or the wide area network N1.

This computer system 400 realizes the image processing apparatus (for example, the image processing apparatus 1 according to the first embodiment or the image processing apparatus 1a according to the second embodiment) by reading out and executing an image processing program (for example, the image processing program 141 according to the first embodiment or the image processing program 141a according to the second embodiment) stored on a recording medium. Here, the recording media includes all types of recording media on which an image processing program is recorded so as to be readable by using the computer system 400 such as "portable-type physical media" including an MO disc, a DVD disc, a flexible disc (FD), an IC card, and the like in addition to a CD-ROM 460 and a USB memory 470, "fixed-type physical media" including an HDD 414, a RAM 412, a ROM 413, and the like that can be internally or externally included in the computer system 400, and "communication media" such as a public circuit N3 that is connected through the modem 450, a local area network or a wide area network N1 to which the PC 481 as another computer system or the server 482 is connected, and the like that store a program for a short time when the program is transmitted.

In other words, the image processing program is recorded on a recording medium such as a "portable-type physical medium", a "fixed-type physical medium", or a "communication medium" in a computer-readable form, and the image processing apparatus is realized by reading out the image processing program from such a recording medium and executing the image processing program by using the computer system 400. In addition, the image processing program is not limited as being executed by the computer system 400, and the present invention can be similarly applied to a case where the PC 481 as another computer system or the server 482 executes the image processing program or a case where the PC 481 and the server 482 cooperatively execute the image processing program.

In addition, the present invention is not limited to the first and second embodiments described above, and various inventions can be made by appropriately combining a plurality of constituent elements disclosed in the embodiments. For example, a configuration may be employed in which several constituent elements are excluded from all the constituent elements illustrated in each embodiment. Alternatively, the constituent elements illustrated in other embodiments may be appropriately combined.

According to an aspect of the present invention described above, there is an advantage that an abnormal area can be detected from an intraluminal image with high accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of processing an image for detecting an abnormal area from an intraluminal image, the method comprising:
generating a reference surface indicating a reference value of each of a plurality of color elements of pixels constituting an intraluminal image at a pixel position of the each color element by performing a morphology process using pixel values of the color elements; and
detecting an abnormal area from the intraluminal image based on a difference for each of the color elements between the pixel value of each pixel and a reference value on the reference surface, the reference value on the reference surface corresponding to a position of the each pixel; and dividing the intraluminal image into a plurality of areas based on edge information of the intraluminal image;
wherein generating the reference surface is performed by performing the morphology process in a three-dimensional space defined by the pixel position and the pixel value, and wherein the generating generates the reference surface for each of the color elements for each of the areas by performing the morphology process for the each of the areas;
wherein detecting an abnormal area is performed by comparing the difference for one color element with the difference for another color element, and wherein the detecting detects an abnormal area for each of the areas based on a difference for each of the color elements between the pixel value of each pixel positioned inside the area and the reference surface generated for the area; and
determining a size of a structure element used in the morphology process for each of the areas based on pixel value information of the inside of the area, or a size of the area and the pixel value information of the inside of the area.

2. An image processing apparatus comprising:
a processor; and
a memory storing computer-readable instructions that, when executed by the processor, implement:
generating a reference surface indicating a reference value of each of a plurality of color elements of pixels constituting an intraluminal image at a pixel position of the each color element by performing a morphology process using pixel values of the color elements;
detecting an abnormal area from the intraluminal image based on a difference for each of the color elements between the pixel value of each pixel and a reference value on the reference surface, the reference value on the reference surface corresponding to a position of the each pixel; and
dividing the intraluminal image into a plurality of areas based on edge information of the intraluminal image;
wherein the generating generates the reference surface by performing the morphology process in a three-dimensional space defined by the pixel position and the pixel value, and wherein the generating generates the reference surface for each of the color elements for each of the areas by performing the morphology process for the each of the areas;
wherein the detecting detects an abnormal area by comparing the difference for one color element with the difference for another color element, and wherein the detecting detects an abnormal area for each of the areas based on a difference for each of the color elements between the pixel value of each pixel positioned inside the area and the reference surface generated for the area; and
wherein the computer-readable instructions further implement determining a size of a structure element used in the morphology process for each of the areas based on pixel value information of the inside of the area, or a size of the area and the pixel value information of the inside of the area.

3. The image processing apparatus according to claim 2, wherein the morphology process includes an opening process and a closing process, and
wherein the computer-readable instructions further implement performing the closing process and then performing the opening process using a result from the closing process.

4. The image processing apparatus according to claim 3, wherein the opening process is conducted so that a convex area on a distribution of the pixel values in the three-dimensional space in which the pixel value is regarded as elevation is smoothed, the convex area locally having a pixel value larger than a pixel value of a periphery thereof, and
wherein the closing process is conducted so that a concave area on the distribution of the pixel values in the three-dimensional space in which the pixel value is regarded as elevation is smoothed, the concave area locally having a pixel value smaller than a pixel value of a periphery thereof.

5. The image processing apparatus according to claim 4, wherein, in the opening process, a structure element is moved while being circumscribed about the intraluminal image from a lower side of the intraluminal image in the three-dimensional space in which the pixel value is regarded as elevation, and
wherein, in the closing process, the structure element is moved while being circumscribed about the intraluminal image from an upper side of the intraluminal image in the three-dimensional space in which the pixel value is regarded as elevation.

6. The image processing apparatus according to claim 2, wherein
the computer-readable instructions further implement:
calculating an area width of the area in a direction perpendicular to a principal axis of the area; and
calculating curvature of a change curve of pixel values along the direction perpendicular to the principal axis, and
the size of the structure element is determined based on the area width and the curvature.

7. The image processing apparatus according to claim 2, wherein
the computer-readable instructions further implement:
extracting color edge pixels of which color edge strength is equal to or more than a predetermined threshold value based on the color edge strength of each pixel positioned inside the area; and
connecting color edge pixels that are linked to one another out of the color edge pixels as one color edge pixel group, and
the size of the structure element is determined based on the number of pixels configuring the color edge pixel group.

8. The image processing apparatus according to claim 2, wherein
the computer-readable instructions further implement:
detecting an abnormal candidate pixel based on the difference for each of the color elements; and
determining whether or not the abnormal candidate pixel is an abnormal pixel belonging to the abnormal area based on relative ratios of the difference for each of the color elements.

9. The image processing apparatus according to claim 8, wherein
the computer-readable instructions further implement:
calculating the difference for each of the color elements; and
normalizing the difference for each of the color elements based on luminance information of the intraluminal image, and
the abnormal candidate pixel is detected based on the difference obtained after normalization for each of the color elements.

10. The image processing apparatus according to claim 8, wherein the computer-readable instructions further implement:
  normalizing the difference for each of the color elements based on magnitude relationship of the pixel values of the plurality of the color elements that is set in advance; and
  determining relative ratios of the differences for each of the color elements based on the differences after the normalization for each of the color elements.

11. The image processing apparatus according to claim 10, wherein the computer-readable instructions further implement calculating ratios of the pixel values of the plurality of the color elements in accordance with the magnitude relationship of the pixel values of the plurality of color elements for each pixel of the intraluminal image and normalizing the differences for each of the color elements based on the ratio for each pixel.

12. The image processing apparatus according to claim 10, wherein the computer-readable instructions further implement calculating ratios of the pixel values of the plurality of the color elements according to the magnitude relationship based on an average value of pixel values of the color elements of each pixel of the intraluminal image and normalizing the difference for each of the color elements based on the ratios.

13. The image processing apparatus according to claim 2, wherein
  the computer-readable instructions further implement:
    detecting an abnormal candidate pixel of each of the areas based on the difference for each of the color elements in each area; and
    determining whether or not the abnormal candidate pixel of each of the areas is an abnormal pixel belonging to the abnormal area based on the relative ratios of the differences for each of the color elements in each area.

14. The image processing apparatus according to claim 13, wherein
  the computer-readable instructions further implement:
    normalizing the difference for each of the color elements in each area based on the magnitude relationship between the pixel values of the plurality of the color elements that is set in advance; and
    determining the relative ratio of the differences for each color element in each area based on the differences after the normalization.

15. The image processing apparatus according to claim 14, wherein the computer readable instructions further implement calculating ratios of the pixel values of the plurality of the color elements according to the magnitude relationship for each of the areas based on an average value of the pixel values for each of the color elements of each pixel positioned inside the area and normalizing the difference for each of the color elements in each of the areas based on the ratios.

16. The image processing apparatus according to claim 2, wherein the pixel values of the plurality of the color elements include an R value, a G value, and a B value of the pixel value.

17. A non-transitory computer-readable recording medium with an executable program stored thereon for detecting an abnormal area from an intraluminal image, wherein the program instructs a processor to perform:
  generating a reference surface indicating a reference value of each of a plurality of color elements of pixels constituting an intraluminal image at a pixel position of the each color element by performing a morphology process using pixel values of the color elements; and
  detecting an abnormal area from the intraluminal image based on a difference for each of the color elements between of the pixel value of each pixel and a reference value on the reference surface, the reference value on the reference surface corresponding to a position of the each pixel; and
  dividing the intraluminal image into a plurality of areas based on edge information of the intraluminal image;
  wherein generating the reference surface is performed by performing the morphology process in a three-dimensional space defined by the pixel position and the pixel value, and wherein the generating generates the reference surface for each of the color elements for each of the areas by performing the morphology process for the each of the areas;
  wherein detecting an abnormal area is performed by comparing the difference for one color element with the difference for another color element, and wherein the detecting detects an abnormal area for each of the areas based on a difference for each of the color elements between the pixel value of each pixel positioned inside the area and the reference surface generated for the area and
  determining a size of a structure element used in the morphology process for each of the areas based on pixel value information of the inside of the area, or a size of the area and the pixel value information of the inside of the area.

* * * * *